No. 788,216. PATENTED APR. 25, 1905.
J. MOELLER.
BUNSEN BURNER FOR LIGHTING AND HEATING PURPOSES.
APPLICATION FILED JUNE 8, 1904.

Witnesses

Inventor

No. 788,216. Patented April 25, 1905.

UNITED STATES PATENT OFFICE.

JULIUS MOELLER, OF LONDON, ENGLAND.

BUNSEN BURNER FOR LIGHTING AND HEATING PURPOSES.

SPECIFICATION forming part of Letters Patent No. 788,216, dated April 25, 1905.

Application filed June 8, 1904. Serial No. 211,621.

*To all whom it may concern:*

Be it known that I, JULIUS MOELLER, a subject of the German Emperor, residing at Victoria Mansions, 26 Victoria street, Westminster, London, England, have invented new and useful Improvements in Bunsen Burners for Lighting and Heating Purposes, of which the following is a specification.

My invention relates to Bunsen burners for incandescent gas-lighting and for heating purposes; and it comprises the novel means hereinafter described whereby a greater amount of illumination or heat is obtained with a given consumption of gas than can be obtained with burners as at present constructed.

A burner for lighting purposes constructed according to my invention is adapted to carry two mantles arranged concentrically and in the space between which the Bunsen flame burns, the interior of the inner mantle being in connection with the atmosphere.

To enable my invention to be fully understood, I will describe the same by reference to the accompanying drawings, in which—

Figure 1:
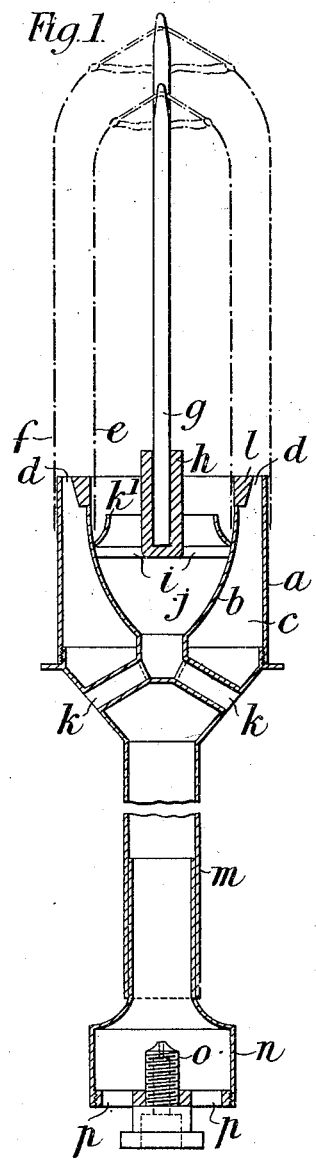
Figure 3:
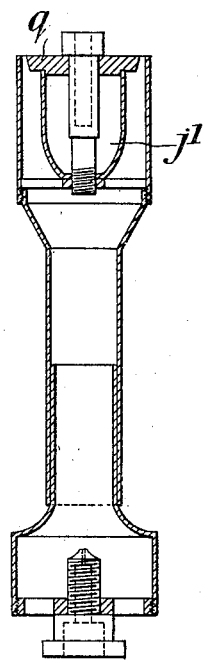
Figure 2:
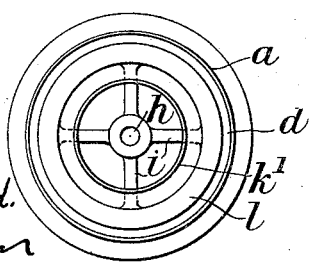

Figure 1 is a sectional elevation of a burner constructed according to my invention. Fig. 2 is a plan view of the same with the mantles removed, and Fig. 3 is a sectional view hereinafter described.

The head of the burner is provided with a cylindrical wall $a$ and with an inner wall $b$, the chamber $c$, formed between the two walls, serving for the passage of the combustible mixture of gas and air to the opening $d$, at which it burns.

$e\ f$ are the inner and outer mantles, respectively, the said mantles, as shown, being mounted upon a rod $g$, carried in a socket $h$, supported by arms $i\ i$ in the chamber $j$, contained within the inner wall $b$; but they may be carried in any other suitable manner. The inner mantle $e$ at its lower end depends into the said chamber $j$, and the outer mantle $f$ hangs outside the head of the burner. With this arrangement it will be understood that the combustion of the mixture of air and gas takes place in the space between the two mantles. In order that the requisite quantity of atmospheric air shall come into contact with the mantle $e$, I provide for admitting air into the chamber $j$—for instance, by means of passages such as $k\ k$ in the head—a shield $k'$ being fixed within the chamber $j$ to prevent the incoming air from striking the lower end of the mantle.

In a burner of this class it is desirable that the combustible mixture should pass through the opening $d$ with considerable velocity, and in order to obviate the necessity for employing artificial means for imparting this velocity to the mixture I advantageously construct the burner as shown, so that the mixture passes through it without meeting with any obstruction, such as wire-gauze and the like, or without having to change its direction of flow. The opening $d$, through which the gas issues from the burner, is a continuous slot, which is formed between the wall $a$ of the head and a ring $l$, which is formed upon or affixed to the inner wall $b$ and beveled more or less on its outward side—say, for example, to an angle of twelve to eighteen degrees—so that there is no constriction of the passage $d$, which would tend to retard the flow of gas before it reaches the point of escape. The sectional area of the passage of the tube $m$ of the burner should also be equal to, if not greater than, the sectional area of the passage through the opening $d$ at the point at which the gas escapes.

$n$ is the mixing-chamber at the bottom of the tube $m$, (which tube is advantageously made in two parts telescoping one into the other, as shown,) and $o$ is the nozzle in the bottom of the mixing-chamber through which the gas issues, the said nozzle being extended up to near the top of the mixing-chamber and the lower end of the tube $m$.

$p\ p$ are the holes or apertures through which the air is admitted to the chamber $n$, the said holes or apertures being at the bottom of the chamber, so that the velocity of the incoming air is not diminished by having to change its direction of flow, as would be the case if the said openings were formed in the sides of the said mixing-chamber. It will be understood that the total sectional area of the said holes $p\ p$ should be about equal to the sectional area of the pipe $m$.

With the arrangement before described the velocity of the mixture due to the jet of gas issuing through the nozzle *o* is not in any way retarded, and, furthermore, the heat of the gas burning at the upper end of the burner tends to increase the flow in a manner which will be obvious.

When my burner is to be used with higher pressures than can be obtained with gas at ordinary pressures, the tube *m* may be lengthened and the beveled ring *l* may be made deeper and the angle more acute than otherwise.

Although the construction hereinbefore described is especially applicable to a burner having two mantles, it is also applicable to a burner having a single mantle or to a burner without a mantle for heating purposes only. In this case the ring *l*, hereinbefore described, is formed as part of a plate *q*, which closes the chamber *j'*, as shown in Fig. 3. Of course in the case of a single mantle or heating burner the passages *k k* for admitting air to the chamber *j'* are unnecessary.

Having now particularly described and ascertained the nature of my said invention and in what manner the same is to be performed, I declare that what I claim is—

1. A Bunsen burner provided with a head having a vertical annular passage therethrough formed by two smooth walls, circular in cross-section and substantially parallel for a portion of their length, the outer wall being vertical throughout its length, and the inner wall tapering sharply outward at a point adjacent to its upper end to form a narrow annular burner-orifice, whereby the combustible vapor is discharged at high velocity without employing artificial means, and without retarding the flow of vapor before it reaches the point of discharge, said head being provided with a central air-passage in communication at its lower end with the atmosphere, means for supporting a mantle outside of said head, and means for supporting a mantle within said central air-passage whereby the combustible vapor is delivered from the burner-orifice between said mantles, substantially as described.

2. In a Bunsen burner, the combination with the hollow head provided with an annular and uninterrupted discharge-aperture at its upper end formed by two concentric smooth circular walls, one of said walls being inclined to the other, to facilitate the discharge of the mixture at high velocity, of a supply-tube connected to said head having its sectional area substantially equal to that of the annular discharge-aperture, and a mixing-chamber connected to the lower end of said tube and having its bottom provided with a gas-inlet and a series of air-inlets, the combined sectional areas of which are substantially equal to the sectional area of said tube, substantially as described.

3. In a Bunsen burner adapted for use with two mantles, the combination with the head having a chamber within the same, into which the inner mantle depends, means for introducing an independent air-supply into said chamber, and an annular deflector, extending from the inner walls of said chamber toward the center thereof, for protecting the lower end of said inner mantle from the air-supply, substantially as described.

4. In a Bunsen burner adapted for use with two mantles, the combination with the head provided with an annular and uninterrupted discharge-aperture for combustible mixture, and having a chamber within said annular discharge-aperture to receive the inner mantle, said head being also provided with air-supply passages extending from the exterior thereof to the said chamber, and an annular deflector within said chamber extending from the walls thereof toward the center and being also curved upwardly, to protect the lower edge of the inner mantle, a supply-tube connected with said head and communicating with said annular discharge-passage, and a mixing-chamber connected to said tube and provided with gas and air inlets, substantially as described.

5. A Bunsen burner provided with a head having a vertical annular passage therethrough formed by two smooth walls, circular in cross-section and substantially parallel for a portion of their length, the outer wall being vertical throughout its length, and the inner wall tapering sharply outward at a point adjacent to its upper end to form a narrow annular burner-orifice, whereby the combustible vapor is discharged at high velocity without employing artificial means, and without retarding the flow of vapor before it reaches the point of discharge, said head being provided with a central air-passage in communication at its lower end with the atmosphere, means for supporting a mantle outside of said head, and means for supporting a mantle within said central air-passage whereby the combustible vapor is delivered from the burner-orifice between said mantles, and a deflector secured to the inner wall of said central air-passage and projecting inwardly to protect the lower end of the inner mantle, substantially as described.

JULIUS MOELLER.

Witnesses:
JOHN E. BOUSFIELD,
C. G. REDFERN.